W. WESTBURY.
DRAWING RING.
APPLICATION FILED JAN. 26, 1916.

1,267,945.

Patented May 28, 1918.

Witnesses
Hugh H. Ott

Inventor
William Westbury
By Victor J. Evans
Attorney

UNITED STATES PATENT OFFICE.

WILLIAM WESTBURY, OF OKMULGEE, OKLAHOMA, ASSIGNOR TO L. S. SKELTON, OF OKMULGEE, OKLAHOMA.

DRAWING-RING.

1,267,945.     Specification of Letters Patent.     Patented May 28, 1918.

Application filed January 26, 1916. Serial No. 74,471.

*To all whom it may concern:*

Be it known that I, WILLIAM WESTBURY, a citizen of the United States, residing at Okmulgee, in the county of Okmulgee and State of Oklahoma, have invented new and useful Improvements in Drawing-Rings, of which the following is a specification.

This invention relates to improvements in drawing rings for use in glass drawing apparatus in the production of glass cylinders from which window glass and the like is made.

In the use of drawing rings of ordinary construction both the surface of the molten glass and the portion of the cylinder being drawn are exposed to the chilling effects of the ordinary protecting jacket or shield and the outer atmosphere, with resultant disadvantages and defects in the character or quality of the work produced. Among these defects are the cooling of the cylinder to such a degree as to make it objectionably rigid and the "denaturing" of the glass contained in the receptacle due to the alternate heating and cooling actions to which it is subjected, whereby purification of such glass is required before it can be used.

The object of the present invention is to provide a drawing ring which is simple of construction and by means of which the cylinder and glass will be protected against undue and too rapid cooling and the glass adjacent to the walls of the ring prevented from becoming unduly chilled or cooled and by repeated action hardened and "denatured" and which will further serve to center and steady the cylinder and prevent it from floating in the body of glass and coming in contact with any of the walls of the apparatus and becoming streaked or thickened.

The invention consists of the features of construction, combination and arrangement of parts hereinafter fully described and claimed, reference being had to the accompanying drawing in which:—

Figure 1:
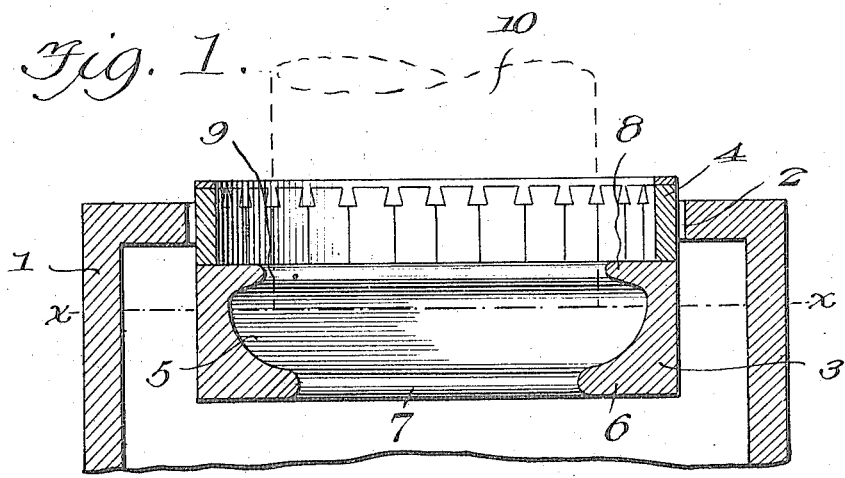
Figure 1 is a vertical section through the drawing ring, a jacket or shield and a portion of a glass receptacle, showing the ring arranged in drawing position.
Figure 2:
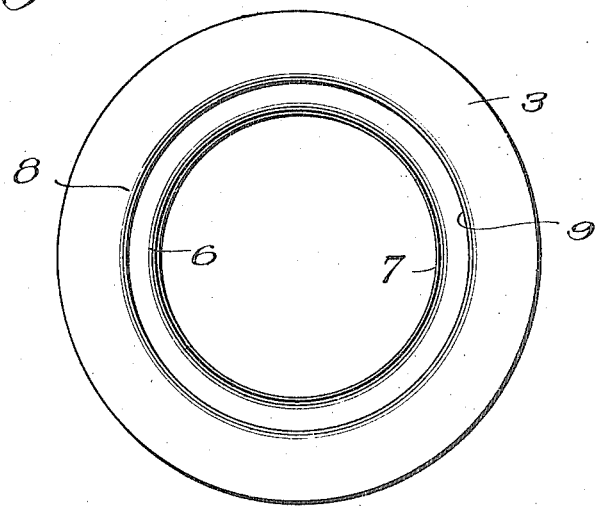
Fig. 2 is a top plan view of the ring.

Referring to the drawing, 1 designates a doghouse or other receptacle containing a supply of molten glass up to the normal level of the line $x$—$x$ from which the cylinder is to be drawn, said receptacle being provided in its top with the drawing opening 2 through which the drawing tool is admitted and the cylinder drawn as usual from the surface of the glass. The drawing ring 3 comprises a floatable body of fire clay or other suitable material which is positioned for use below and in line with the drawing opening. This drawing ring is designed in practice to be employed in conjunction with a suitable type of tubular shield or jacket 4 which rests thereon and extends outwardly through the drawing opening to a sufficient height to shield and protect the surface of the glass in the drawing ring and the lower portion of the cylinder which is being drawn from direct drafts of air. This shield or jacket does not, however, entirely prevent access of air to the glass and cylinder and as it is cooled to a certain degree by being directly exposed to the outer atmosphere it serves, by reason of the fact that it is of much lower temperature than the molten glass and cylinder, to reduce the temperature of the confined portions of air coming in contact with the surface of the molten glass and lower portion of the cylinder, with the resultant disadvantages above stated. The ring 3 is accordingly constructed with the object of overcoming these objections and disadvantages and at the same time obtaining other advantages, over drawing rings of ordinary construction, as hereinafter fully described.

As shown, the ring 3 is provided with a chamber 5 of proper diameter and capacity to receive an adequate quantity of molten glass to be presented for the action of the drawing tool. This ring floats upon the surface of the glass in the receptacle 1 and is provided with a bottom wall 6 in the form of an inwardly extending annular flange providing an inlet opening 7 for the passage of the molten glass from a point beneath the surface line $x$—$x$ to the chamber 5. This chamber is preferably flaring or bowl-shaped and is partially covered at its top by an annular guard flange 8 extending inwardly at the top of the ring and forming a drawing opening 9 for the admission of the drawing tool and the drawing out of the glass cylinder, as indicated by dotted lines at 10. The opening 9 is of greater diameter than the opening 7, but of just sufficiently greater diameter to allow the cylinder to be blown out initially to a diameter less than that of the opening 9 but somewhat greater than that of the opening 7. By this relative dimensioning of the openings and cylinder the glass will be drawn directly above and in coaxial alinement with the inlet, thus making the drawing tension and suction uniform and causing a uniform and even flow of molten glass from the receptacle 1 into the chamber 5 to take the place of that drawn out, and also insuring a substantially uniform temperature of the glass at all points in the drawing ring, by which any tendency of the cylinder to float with the glass in any direction will be entirely overcome or reduced to the minimum. Hence the cylinder will be centered and steadied and prevented from coming in contact with the guard flange 8 or any other wall of the apparatus and becoming streaked, ridged or thickened.

The purpose of the flange 8 is to substantially close the space above the surface of the molten glass and between the shield and lower end of the cylinder and to overhang the portion of the glass beyond the line of the cylinder, by which a barrier of non-conducting material is interposed between the said surfaces and the outer atmosphere and guard, thus protecting the molten glass and base of the cylinder from unduly rapid cooling effects of the outer atmosphere and the guard or shield to a maximum degree. This flange or barrier 8 also serves to prevent chilling of the wall of the drawing ring and the consequent chilling and hardening and denaturing of the portions of the glass adjacent thereto from repeated drawing actions. As a result the glass is kept at a higher temperature and in better condition in point of fluidity for the draw and with less surface impurities, and denaturing reduced or retarded, while the lower end of the cylinder is also maintained in a more plastic condition, allowing the cylinder to be drawn with greater ease and to a greater length and with a more uniform degree of thickness.

In the use of the drawing ring, the ring is brought into position from within the furnace chamber beneath the drawing opening and the shield or guard 4 placed in position thereon, after which the drawing tool is inserted, the bait of the tool taking up the glass from the supply in the chamber 5 and forming the neck of the cylinder which is then blown out to the desired diameter and drawn to produce a cylinder of desired length. After the completion of the draw and severance of the cylinder the ring may be shoved back into the furnace chamber to be reheated and another ring brought forward in its place, or succeeding draws may be made from a single ring where proper conditions for such use exist. It will be observed that the bowl-shaped form of the chamber 5 widens the body of molten glass therein at the surface to insure an adequate supply to the drawing tool and decreases the width of the body of molten glass above the entrance opening 7 for the purpose of securing an even, regular and uniform supply of the glass to the ring, as previously explained. The bowl-shaped formation of the chamber also provides a sloping surface for the free drainage of the melted aftermath into the body of molten glass in the kiln and the entrance of fresh and purified glass to take its place.

I claim:—

1. A glass drawing apparatus comprising a receptacle, a ring therein having an upper and lower internal flange, the opening formed by the lower flange being of less diameter than that formed by the upper flange and said flanges forming a chamber, and a shield resting on the top of said ring and projecting from the receptacle.

2. A device of the class described comprising a ring having upper and lower inwardly projecting flanges forming a chamber, the opening formed by the lower flange being of less diameter than that formed by the upper flange, and the lower face of the upper flange being substantially horizontal and the upper face of the lower flange curving upwardly to form the chamber of bowl shape, and a shield removably supported by said ring.

In testimony whereof I affix my signature in presence of two witnesses.

WILLIAM WESTBURY.

Witnesses:
A. L. NIXON,
J. T. PANCOAST.

Copies of this patent may be obtained for five cents each, by addressing the "Commissioner of Patents, Washington, D. C."